(12) United States Patent
Paulessen et al.

(10) Patent No.: US 10,433,471 B2
(45) Date of Patent: Oct. 8, 2019

(54) AGRICULTURAL IMPLEMENT HAVING AN AUXILIARY CHASSIS

(71) Applicant: Lemken GMBH & CO. KG, Alpen (DE)

(72) Inventors: Georg Paulessen, Viersen (DE); Georg Achten, Tonisvorst (DE)

(73) Assignee: Lemken GMBH & CO. KG (DE)

( * ) Notice: Subject to any disclaimer, the term of this patent is extended or adjusted under 35 U.S.C. 154(b) by 0 days.

(21) Appl. No.: 15/540,337

(22) PCT Filed: Jan. 6, 2016

(86) PCT No.: PCT/DE2016/100003
§ 371 (c)(1),
(2) Date: Jun. 28, 2017

(87) PCT Pub. No.: WO2016/110290
PCT Pub. Date: Jul. 14, 2016

(65) Prior Publication Data
US 2017/0354076 A1    Dec. 14, 2017

(30) Foreign Application Priority Data

Jan. 9, 2015    (DE) ................. 10 2015 100 273

(51) Int. Cl.
*A01B 63/16*        (2006.01)
*A01B 49/02*        (2006.01)
(Continued)

(52) U.S. Cl.
CPC ............ *A01B 49/027* (2013.01); *A01B 63/02* (2013.01); *A01B 63/16* (2013.01); *A01D 41/16* (2013.01); *A01B 73/00* (2013.01); *A01D 75/00* (2013.01)

(58) Field of Classification Search
CPC ........ A01B 63/16; A01B 63/166; A01B 63/22
See application file for complete search history.

(56) References Cited

U.S. PATENT DOCUMENTS 2,383,373 A * 8/1945 Dewey ................. A01B 63/163
                                                    172/671
2,981,344 A * 4/1961 Roberson ................. A01B 3/26
                                                    172/386
(Continued)

FOREIGN PATENT DOCUMENTS

CA        2210238 A1    1/1999
CA        2909652 A1    10/2014
(Continued)

*Primary Examiner* — Matthew Troutman
(74) *Attorney, Agent, or Firm* — The Watson IP Group, PLC; Jovan N. Jovanovic

(57) ABSTRACT

A ground working implement comprises a frame for receiving working tools and a trailer tower on one side of the ground working implement for attaching the ground working implement to a vehicle. An auxiliary chassis arranged on an other side of the ground working implement with at least one wheel arm and a wheel rotatably fastened thereto. The at least one wheel arm is movable vertically with respect to the ground working implement via at least one linkage. At least one energy accumulator is arranged movably between the frame and the at least one wheel arm with at least one bearing, wherein the at least one bearing is arranged on a straight line. The at least one linkage is arranged in a lowered position and a raised position of the at least one wheel arm along the straight line.

9 Claims, 3 Drawing Sheets

Direction of travel

(51) Int. Cl.
*A01B 63/02* (2006.01)
*A01D 41/16* (2006.01)
*A01B 73/00* (2006.01)
*A01D 75/00* (2006.01)

(56) References Cited

U.S. PATENT DOCUMENTS

| | | | | |
|---|---|---|---|---|
| 3,336,049 A | * | 8/1967 | Cayton | A01B 63/22 172/316 |
| 3,554,295 A | * | 1/1971 | Kopaska | A01B 39/08 172/398 |
| 3,870,107 A | * | 3/1975 | Orthman | A01B 63/22 172/260.5 |
| 3,912,017 A | * | 10/1975 | Rehn | A01B 21/083 172/328 |
| 4,178,005 A | * | 12/1979 | Kent, Jr. | B60B 33/04 172/417 |
| 4,326,594 A | * | 4/1982 | Oka | A01B 63/22 172/328 |
| 4,373,590 A | * | 2/1983 | Wittrock | A01B 33/021 172/103 |
| 4,817,730 A | | 4/1989 | Winter | |
| 5,228,522 A | * | 7/1993 | Stufflebeam | A01B 63/11 172/413 |
| 5,431,232 A | | 7/1995 | Kirsch | |
| 6,302,220 B1 | * | 10/2001 | Mayerle | A01B 63/11 172/459 |
| 8,261,845 B2 | * | 9/2012 | Palen | A01B 63/22 172/396 |
| 2004/0079223 A1 | * | 4/2004 | Steinlage | A01B 63/22 91/368 |
| 2014/0262373 A1 | * | 9/2014 | Landoll | A01B 33/02 172/260.5 |
| 2016/0081261 A1 | * | 3/2016 | Paulessen | A01B 63/1145 172/195 |
| 2017/0354076 A1 | | 12/2017 | Paulessen et al. | |

FOREIGN PATENT DOCUMENTS

| | | |
|---|---|---|
| CN | 103513589 A | 1/2014 |
| DE | 1028369 B | 4/1958 |
| DE | 2531289 B1 | 2/1976 |
| DE | 102012016348 A1 | 2/2014 |
| DE | 102013007038 A1 | 10/2014 |
| EP | 2591651 A1 | 5/2013 |
| EP | 3242543 A1 | 11/2017 |
| JP | S28-5753 | 11/1953 |
| WO | 2013036191 A1 | 3/2013 |
| WO | WO2013036191 A1 | 3/2013 |

* cited by examiner

Direction of travel

Direction of travel

AGRICULTURAL IMPLEMENT HAVING AN AUXILIARY CHASSIS

BACKGROUND OF THE DISCLOSURE

The invention relates to an agricultural implement according to the preamble of claim 1.

A ground working implement with hydraulically actuated supporting wheel is known from the German application DE 10 2012 016 348 A1. In order to relieve the towing tractor of a part of the weight of the implement in the lifted position, the support wheel may be pressed hydraulically to the ground and thus carry part of the weight of the implement. This improves the steering ability of the towing tractor. To ensure that the support wheel does not leave any tracks in the ground during operation, this may also be lifted hydraulically above the ground surface. However, the hydraulic support wheel must be operated separately via a control valve during the lifting operation of the implement.

German patent application DE 10 2013 007 038 A1 uses a mechanical solution, wherein a weight fraction of a heavy packer roller is transferred to a support wheel via a four-point linkage. In the lowered state, the support wheel arm is pushed upwards due to the weight of the implement, so that the support wheel likewise does not leave any tracks in the ground being worked. However, the effectiveness of the support wheel to relieve loading on the front axle of the tractor varies with different roller weights. The front part of the implement must also be carried by the towing vehicle.

The object of the present invention is to relieve the towing vehicle of a part of the implement weight without actuating further additional hydraulic devices, as well as leaving the ground surface free of any tracks behind the implement in the working position.

This object is achieved by the features of the characterizing part of claim 1.

At least one support wheel on the ground working implement in conjunction with an energy accumulator is provided by the vertically movable arrangement, which can move into two positions via a dead center position, while, in a lowered implement position which preferably corresponds to the working position, the placing of the support wheel on the ground subjects the energy accumulator to supporting energy and is displaced through its dead center position so that the energy accumulator, after passing through this position, lifts the support wheel with its stored energy above the ground. If the ground working implement is lifted by the towing vehicle, the energy accumulator passes through its dead center position in the opposite direction by means of an articulated linkage arrangement and presses the support wheel against the ground surface with a supporting force in the raised implement position. Since the energy accumulator is also supported against the frame of the ground working implement, part of the implement weight is supported by the support wheel. The lifting force requirement of the towing vehicle is reduced, thus improving its steering ability.

Optimum energy utilization is achieved by arranging the line of action of one or more energy accumulators on an imaginary line or plane, which runs through the counter bearings or their bearing points or bearing axles. Several energy accumulators may be connected in parallel or in series. A multiple counter bearing arrangement with respectively associated energy accumulators is also conceivable, for example on the right and left or above and below the wheel arm.

By connecting the wheel arm to the frame of the ground working implement, on the one hand, as well as with the energy accumulator and one or more deflection mechanisms, on the other hand, one achieves an effective design, wherein the energy accumulator may be positioned in more favorable installation spaces in order not to interfere with the effect of ground working tools.

The deflection mechanism also provides a further possibility for representing transmission ratios and other kinematic dependencies between the frame, the energy accumulator and the movable wheel arm.

Different implement weights or equipment variants may be compensated for by using an energy accumulator with adjustable preloading.

In this way, energy accumulators with a progressive, linear or degressive characteristic may be used.

The energy accumulator may be configured in one or more parts in order to store different characteristics. In addition, a combination of different spring types, as mentioned above, is also conceivable in a linkage, as well as a spatially separated construction.

In addition to conventional springs, elastomer springs, piston-cylinder springs or bellows springs with optionally coupled pressure or energy accumulators are included. If the energy accumulator is formed as a fluid cylinder with a pressure accumulator connected thereto, an effective and compact design is also possible. Combining this system with a pressure supply and the necessary valves, provides for a comfortable and variable adjustment of the support and lifting forces.

The displacement of at least one counter bearing, as occurs, for example, during the passage of the dead center position, may be assisted or only released by a further auxiliary device, which is triggered by an external force. For example, this auxiliary device may be actuated by raising the implement or by lowering a support roller, and thus, depending on the position, the energy accumulator or at least one of its counter bearings may be shifted from a raised position to a working position and inversely, and/or secured there.

When the auxiliary device is operatively connected directly to the lifting device of the towing vehicle, the energy accumulator or its counter bearing is displaced, for example, by applying an upper linkage force, while its effect for lifting or lowering the support wheel is coupled with the lifting movement of the towing vehicle. This particularly facilitates the working sequence upon turning at the headland to be worked.

As the auxiliary chassis is also designed as a function of a reconsolidation device for the worked ground, a further multiple use is achieved. The auxiliary chassis may then also be used in the working position of the device for depth guidance of the same. The lifting force acting on the auxiliary chassis then acts as a holding force via the frame on the ground working implements at the front, and is used precisely in heavy ground conditions to ensure the working quality of the implement. Agricultural implements with a large working width are often provided with a multipart foldable base frame in order to achieve good ground adaptation, on the one hand, and an acceptable width for road transport, on the other hand. In such a configuration, the auxiliary chassis and its components, in addition to energy accumulators, are preferably arranged at a central region of the frame, so that the function and advantages of the invention are retained even in the case of laterally-foldable frame parts. Preferably, the devices for the depth guide of the implement pivot with the side parts of the foldable or pivotable frame.

The invention is distinguished in particular by the fact that, by utilizing the lifting forces or lifting movement of a towing vehicle, an energy accumulator of an agricultural implement is displaced in its linkage in such a way that a part of the implement weight is transmitted via the energy accumulator to an auxiliary chassis in the lifted state of the implement, thus relieving the towing vehicle and, in the working position, relieving or lifting the auxiliary chassis via the same energy accumulator, and thus reducing or avoiding any disturbing influences of the auxiliary chassis on the work implement.

Further details and advantages of the subject matter of the invention are given in the following description and the accompanying drawings in which an exemplary embodiment with the necessary details is shown:

DETAILED DESCRIPTION OF THE DISCLOSURE

Figure 1:
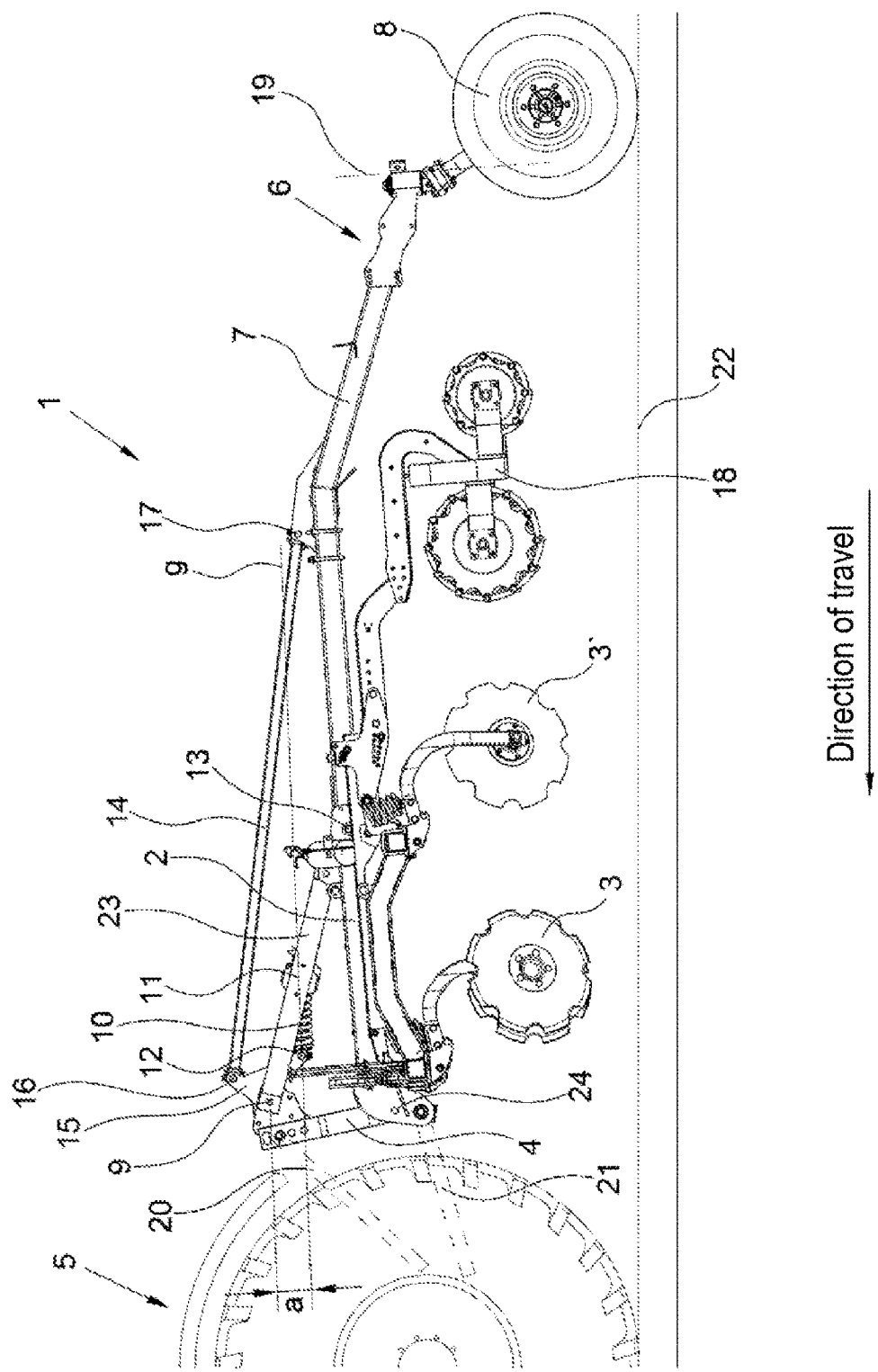
FIG. 1 shows a side view of a vehicle with attached ground working implement in the raised position.

FIG. 1 schematically shows the rear part of a vehicle 5 which carries an agricultural working implement 1. The agricultural working implement 1 is connected to the towing vehicle 5 via a lifting device, consisting of an upper linkage 20 as well as two lower linkages 21, also known as three-point linkages. The upper linkage 20 as well as the lower linkages 21 are thereby movably coupled at the respective fastening points of the trailer tower 4 or of the frame 2. The frame 2 adjoining the trailer tower 4 extends to the rear as well as to the side of the implement center and carries the working tools 3, 3', which are arranged, for example, as two rows of concave disks next to one another and offset relative to one another on the frame. Various arrangements of tine bars or other tools, also in combination, are also possible. A depth guidance device 18 in the form of a tandem roller is mounted on the frame 2 in a height-adjustable manner behind the working tools 3, 3' and serves for the depth guidance of the working tool 1 or else for the leveling or re-consolidation of the soil material raised by the working tools 3, 3'. A linkage 13, the linkage axis of which preferably extends transversely to the direction of travel, connects the wheel arm 7 in a height-adjustable manner to the frame 2 of the agricultural implement 1. A wheel is pivotally mounted at the other end of the wheel arm 7 to rotate about the axis 19, and form, together with the wheel arm 7, the auxiliary chassis 6, which supports a part of the weight of the implement 1 on the ground 22. The other part of the weight of the implement 1 is supported at the front of the towing vehicle 5 via the lifting device, consisting of upper and lower linkages 20, 21. A strut 14 is movably connected to the wheel arm 7 via a linkage 17. The other end of the strut 14 is coupled to the deflection device 15 with a further linkage 16. The deflection device 15 is, in turn, movably connected to the strut 23 via the linkage 9 and thus at least indirectly to the frame 2. The strut 23 thereby forms part of the frame 2 and is guided in the upper region by the trailer tower 4. A counter bearing 11 for the energy accumulator 10 is arranged on the strut 23, as is a further counter bearing 12 at the lower end of the deflection device 15. The energy accumulator 10, in this case a compression spring, is pre-loaded and acts in the direction of the straight line g, which runs through the center point of the counter bearings 11 and 12 with which the effective lever spacing a transmits a torque about the linkage 9 to the deflection device 15, which applies a pressure force to the strut 14 via the linkage 16 and presses the wheel arm 7, and thus the auxiliary chassis 6, against the ground 22. Thus, the agricultural implement 1 is relieved of the amount of the wheel loading of the auxiliary chassis 6 and requires a lower lifting force from the towing vehicle 5. During travel over ground irregularities, a large part of the movements of the auxiliary chassis 6 occurring therewith, is movably compensated via the described mechanism and the energy accumulator. The front attachment tower is connected to the frame to pivot about one or more pivot points 24. An elongated hole connects the upper part of the trailer tower to the strut 23 via a transverse bolt and prevents the implement 1 from falling down due to its own weight. In this case, a further transverse bolt engages in a cam or a hook nose of the deflection device 15 and, in the lifted state of the implement 1, prevents the deflection device from pivoting through a dead center into the upper position which would result in the lifting of the auxiliary chassis from the ground 22.

Figure 2:
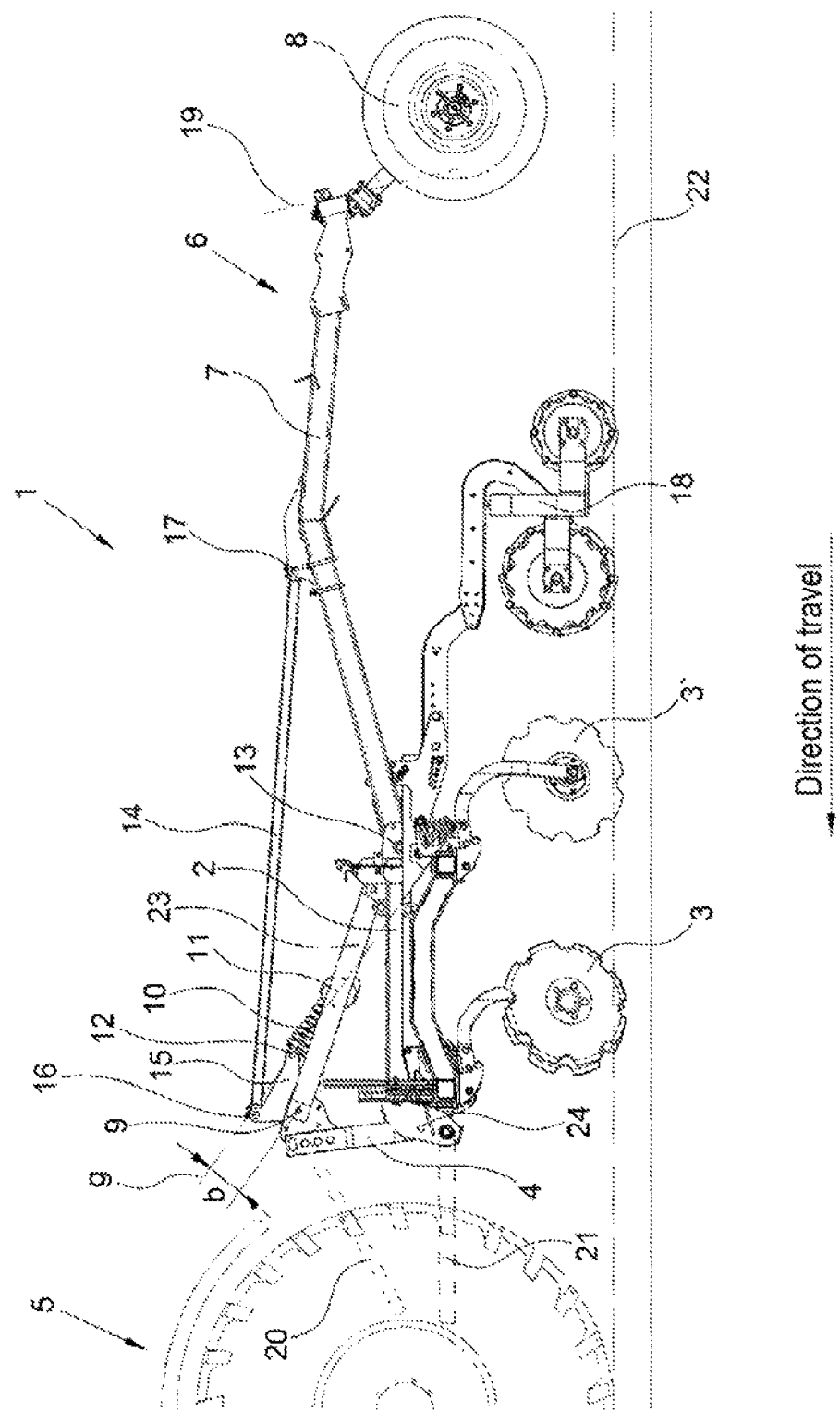
FIG. 2 shows the side view of a vehicle with a ground working implement in the working position.

FIG. 2 shows the same situation as FIG. 1, but with a lowered implement 1 in the working position. At the same time, the working tools 3, 3' cut into the ground 22 and the implement weight is supported on the ground by the depth guidance device 18. This creates a pressure force in the upper linkage 20, which pushes the trailer tower backwards in the previously described elongated hole. By this movement of the trailer tower, the cam or the nose of the deflection device 15 is released. The deflection device 15 pivots about the linkage 9 against the force of the energy accumulator 10 via a dead center through the support load generated on lowering the device 1 on the auxiliary chassis and thus on the wheel arm 7 and applies the pressure force produced thereby to the strut 14. Upon rotation of the deflection device 15, the counter bearing 12 is shifted, and thus the straight line g extending through the counter bearings 11 and 12 is shifted by the distance b to the other side, namely above the point of linkage 9. The again pre-loaded energy accumulator now generates a torque of the deflection device 15 about the linkage 9 in the direction of the straight line g with the effective lever spacing b, in the opposite direction to that described in FIG. 1.

As a result, a tensile force is transmitted via the linkage 16 to the strut 14, which lifts the wheel arm 7 and thus lifts the entire auxiliary chassis 6 from the ground against its own weight about the linkage 13. Thus, the auxiliary chassis 6 or the wheel 8 leaves no, or at least no deep, tracks in the worked ground 22.

Figure 3:
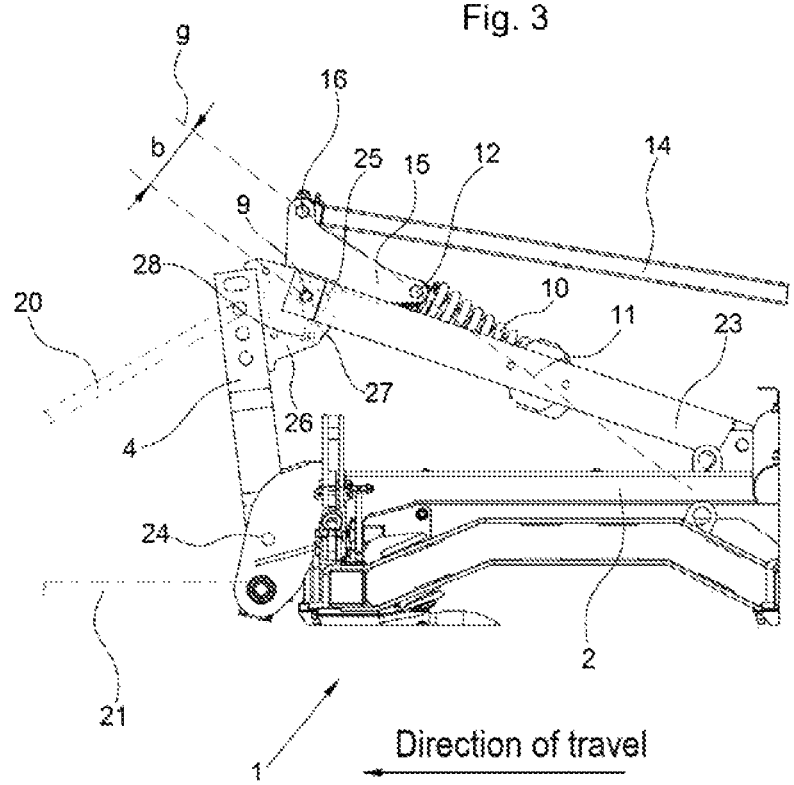
FIG. 3 shows a detailed view of FIG. 2.

FIG. 3 shows a detailed section of the working implement 1 from FIG. 2, with some components in a concealed manner and shown by dashed lines in order to facilitate understanding. The implement 1 is located on the ground in the working position and is supported by the rear depth guidance device (not shown). By means of the articulated suspension of the implement 1 at the upper linkage 20 and the lower linkages 21, a compressive force acts on the trailer tower 4 through the upper linkage 20, as a result of which the latter pivots backwards about the pivot point 24 relative to the linkage 9 of the deflection device 15 or the strut 23. The brackets 26, which are provided with an elongated hole 25, are welded or screwed to the trailer tower 4 and limit the above-described pivotal movement of the trailer tower 4 so that the linkage bolt of the linkage 9 protrudes through the elongated hole 25, and, in addition, rotatably supports the deflection device 15 lying between the brackets 26, and connects it to the struts 23 lying outside the brackets 26. The linkage bolt of the linkage 9 is located at the front end of the elongated hole 25 and delimits the pivoting range of the coupling tower 4 or of the brackets 26 attached thereto. The wheel arm (not shown) is supported on the ground and exerts a compressive force via the strut 14 and the linkage 16 on the deflection device 15.

As a result, the energy accumulator 10 is compressed and moved through the dead center into the illustrated upper position, which is represented by the distance b from the linkage 9 along the straight line g. As already described in FIG. 2, the force from the energy accumulator is sufficient to lift the wheel arm and the wheel above the ground, and thus the auxiliary chassis against its own weight by means of the deflection device 15 and strut 14, to such an extent that no, or at least no deep, tracks are left by the wheel in the ground. In this case, a stop 27 which is fastened between the two brackets 26 limits the movement of the deflection device 15, wherein a cam 28 of the deflection device 15 designed as a hook nose, abuts the stop 27. The stop 27 is designed as an eccentric hexagonal bolt in order to keep a sufficient ground clearance of the wheel arm above the ground. Further adjustment possibilities within the kinematic system are likewise conceivable, as for example spindles, perforated strips, etc.

Figure 4:
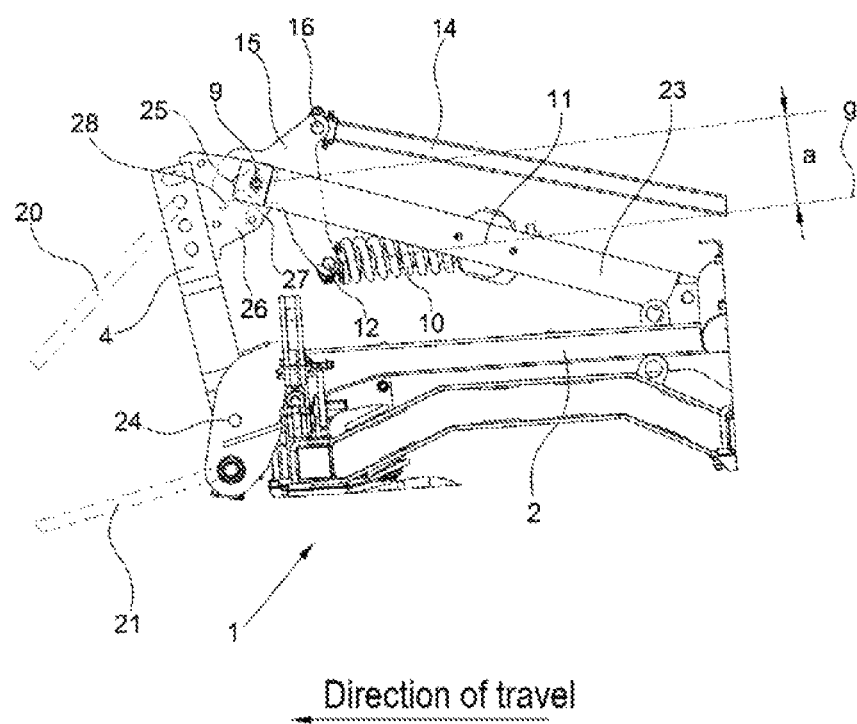
FIG. 4 shows a detailed view of FIG. 1.

FIG. 4 shows the same arrangement as FIG. 3, but in the lifted position of the working implement 1 according to FIG. 1. By the lifting force or lifting movement of the lower linkage 21 acting on the front part of the implement 1, the latter falls under its own weight and produces a tensile force in the upper linkage 20. As a result, the trailer tower 4 pivots forward with its brackets 26 and the stop 27 about the pivot point 24. The stop presses against the cam 28 of the deflection device 15 and moves it around the linkage 9. As a result, the pivot point 12 is displaced downwards until the energy accumulator 10 attached thereto passes through its dead center position and with the now emerging lever arm with a distance a between the linkage 9 along the straight line g generates a torque about the axis of the linkage 9 and generates a compressive force via the linkage 16 in the direction of the strut 14, which acts on the wheel arm (not shown). Since the elongated holes 25 of the brackets 26 are butt against the bolts of the linkage, the implement 1 is lifted by the upper linkage 20 and the lower linkage 21, as is also shown in FIG. 1. However, a part of the implement weight is supported on the ground via the wheel arm and the wheel and thus the lifting device of the towing vehicle is partially relieved during the lifting movement or at least in its upper position.

LIST OF REFERENCE NUMERALS

1 Agricultural working implement
2 Frames
3 Working tool
4 Trailer tower
5 Vehicle
6 Auxiliary chassis
7 Wheel arm
8 Wheel
9 Linkage
10 Energy accumulator
11 Counter bearing
12 Counter bearing
13 Linkage
14 Strut
15 Deflection device
16 Linkage
17 Linkage
18 Depth guide
19 Axis
20 Upper linkage
21 Lower linkage
22 Ground
23 Strut
24 Pivot point
25 Elongated hole
26 Bracket
27 Stop
28 Cams

The invention claimed is:

1. A ground working implement, comprising:
a frame for receiving working tools and a trailer tower on one side of the ground working implement for attaching the ground working implement to a vehicle, and an auxiliary chassis arranged on an other side of the ground working implement with at least one wheel arm and a wheel rotatably fastened thereto, wherein the at least one wheel arm is movable vertically with respect to the ground working implement via at least one linkage, wherein at least one energy accumulator is arranged movably between the frame and the at least one wheel arm with at least one bearing, wherein the at least one bearing is arranged on a straight line;
wherein the at least one linkage is offset on first and second sides of the straight line when arranged in a lowered position of the at least one wheel arm and in a raised position of the at least one wheel arm, respectively.

2. The ground working implement according to claim 1, wherein a resulting effective line of the at least one energy accumulator is approximately on the straight line which runs through the at least one bearing.

3. The ground working implement according to claim 1, wherein the at least one linkage includes a first linkage and a second linkage, the at least one wheel arm is movably connected to the frame via the first linkage and is connected to the at least one energy accumulator via the second linkage.

4. The ground working implement according to claim 1, wherein pre-loading of the at least one energy accumulator is adjustable.

5. The ground working implement according to claim 1, wherein the at least one energy accumulator is a one-part or multi-part spring assembly.

6. The ground working implement according claim 1, wherein the at least one energy accumulator is a fluid reservoir with a pressure accumulator connected thereto.

7. The ground working implement according to claim 1, further comprising an auxiliary device supported by an external force to move the at least one bearing from a first position into a second position.

8. The ground working implement according to claim 1, further comprising an auxiliary device to cooperate with a lifting device of a towing vehicle to displace a position of the at least one bearing.

9. The ground working implement according to claim 1, wherein the frame of the ground working implement is a multi-part folding or pivoting frame.

* * * * *